US012705617B2

(12) United States Patent
Singh et al.

(10) Patent No.: US 12,705,617 B2
(45) Date of Patent: Aug. 11, 2026

(54) SYSTEMS AND METHODS FOR ENHANCED PUBLIC KEY AUTHENTICATOR VIABILITY

(71) Applicant: Mastercard International Incorporated, Purchase, NY (US)

(72) Inventors: Sachin Kumar Singh, Pune (IN); Kaushal Shetty, O'Fallon, MO (US); Mayank Joshi, Pune (IN)

(73) Assignee: Mastercard International Incorporated, Purchase, NY (US)

( * ) Notice: Subject to any disclaimer, the term of this patent is extended or adjusted under 35 U.S.C. 154(b) by 134 days.

(21) Appl. No.: 18/670,905

(22) Filed: May 22, 2024

(65) Prior Publication Data

US 2025/0363491 A1 Nov. 27, 2025

(51) Int. Cl.
*G06Q 20/40* (2012.01)

(52) U.S. Cl.
CPC .................................. *G06Q 20/401* (2013.01)

(58) Field of Classification Search
None
See application file for complete search history.

(56) References Cited

U.S. PATENT DOCUMENTS 8,885,894 B2 * 11/2014 Rowen .................. G06Q 20/20 705/16
9,846,875 B2 12/2017 Mcneal
10,142,308 B1 11/2018 Duchin et al.
11,238,349 B2 2/2022 Novik et al.
11,682,016 B2 * 6/2023 Kumar .............. G06Q 20/3227 705/76

(Continued)

FOREIGN PATENT DOCUMENTS

KR 102480400 12/2022

OTHER PUBLICATIONS

M. B. Boubker, S. Ouahabi, K. Elguemmat and A. Eddaoui, "A comprehensive Study on Credit Card Fraud Prevention and Detection," 2021 Fifth International Conference on Intelligent Computing in Data Sciences (ICDS), Fez, Morocco, 2021, pp. 1-8, doi: 10.1109/ICDS53782.2021.9626749 (Year: 2021).*

(Continued)

*Primary Examiner* — Eduardo Castilho
(74) *Attorney, Agent, or Firm* — Hovey Williams LLP

(57) ABSTRACT

A computer-implemented method includes: receiving a signed challenge from a public key authenticator of a mobile device registered to a financial account of a user; receiving a transaction request and transaction data associated with the signed challenge; determining that the public key authenticator satisfies a basic integrity requirement; receiving stopgap authenticator data including device security data and one or more of the following: a user personal identifier, a user personal credential, transaction history data of the user, and behavioral biometrics data generated at the user mobile device; comparing the stopgap authenticator data to a hidden profile for the financial account to determine that a matching threshold is satisfied; based on the satisfaction of the matching threshold and of the basic integrity requirement, generating a stopgap authenticator token; and transmitting the stopgap authenticator token and the transaction data for real-time transaction approval.

18 Claims, 5 Drawing Sheets

(56) References Cited

U.S. PATENT DOCUMENTS

| | | | | |
|---|---|---|---|---|
| 2013/0036458 | A1* | 2/2013 | Liberman | G06F 21/31 726/5 |
| 2013/0343616 | A1 | 12/2013 | Forero et al. | |
| 2016/0292688 | A1* | 10/2016 | Barton | G06Q 20/367 |
| 2019/0097812 | A1* | 3/2019 | Toth | G06F 21/602 |
| 2021/0273931 | A1* | 9/2021 | Murdoch | H04L 9/3239 |
| 2023/0131095 | A1* | 4/2023 | Korten | G06F 3/0481 713/171 |
| 2024/0086513 | A1* | 3/2024 | Deutschmann | G06F 21/32 |
| 2024/0144247 | A1* | 5/2024 | Chaturvedi | G06Q 20/36 |
| 2025/0037109 | A1* | 1/2025 | Mantoni, Jr. | G06Q 20/401 |
| 2025/0053977 | A1* | 2/2025 | Ferenczi | G06Q 20/363 |
| 2025/0141685 | A1* | 5/2025 | Gean | G06Q 20/382 |

OTHER PUBLICATIONS

B. A. Smadi, A. A. S. AlQahtani and H. Alamleh, "Secure and Fraud Proof Online Payment System for Credit Cards," 2021 IEEE 12th Annual Ubiquitous Computing, Electronics & Mobile Communication Conference (UEMCON), New York, NY, USA, 2021, pp. 0264-0268, doi: 10.1109/UEMCON53757.2021.9666549 (Year: 2021).*

W. Ahmed et al., "Security in Next Generation Mobile Payment Systems: A Comprehensive Survey," in IEEE Access, vol. 9, pp. 115932-115950, 2021, doi: 10.1109/ACCESS.2021.3105450. (Year: 2021).*

Shehu et al,, "SPIDVerify: A Secure and Privacy-Preserving Decentralised Identity Verification Framework," 2023 International Conference on Smart Applications, Communications and Networking (SmartNets), Istanbul, Turkiye, 2023, pp. 1-7, doi: 10.1109/SmartNets58706.2023.10215588 (Year: 2023).*

Ahmed, K.A.M., Saraya, S.F., Wanis, J.F., & Ali-Eldin, A.M.T. (2023). A Blockchain Self-Sovereign Identity for Open Banking Secured by the Customer's Banking Cards. Future Internet, 15, 208.

Archipels, What Does Payment in Self-Sovereign Identity Would Look Like? https://en.archipels.io/post/what-does-payment-in-self-sovereign-identity-look-like (Mar. 17, 2022).

Biometric Update.com, article by Burt, Chris entitled Biometrics with self-sovereign identity combo pitched to solve authentication challenges. https://www.biometricupdate.com/202210/biometrics-with-self-sovereign-identity-combo-pitched-to-solve-authentication-challenges (Oct. 19, 2022).

Cyburtrust article entitled Cryptographic-Biometric Self-Sovereign Personal Identities, by Doron Drusinsky & Michael, James Bret, Computer, 55(6), (pp. 96-102) (Jun. 2022).

FM Contributors article entitled The Future of Digital Identity: Biometrics, Self-Sovereign Identity, and Beyond. https://www.financemagnates.com/fintech/data/the-future-of-digital-identity-biometrics-self-sovereign-identity-and-beyond/ (Apr. 21, 2023).

* cited by examiner

SYSTEMS AND METHODS FOR ENHANCED PUBLIC KEY AUTHENTICATOR VIABILITY

FIELD OF THE DISCLOSURE

The field of the disclosure relates generally to authentication for a financial transaction and, more particularly, to systems and methods for enhancing the viability of public key cryptography authenticators for use with high risk transactions.

BACKGROUND OF THE DISCLOSURE

A public key authenticator installed on a mobile device, such as a smartphone, may generate a signed challenge authenticating the device for participation in a financial transaction. To trigger generation of the signed challenge, a user of the device must ensure that predetermined conditions—usually established during a preceding registration phase—of the public key authenticator are met. For example, the predetermined conditions may include entry of credentials, proof of device possession, display of a physical characteristic recognized as a biometric factor, or the like. Once the predetermined conditions are satisfied, the public key authenticator will unlock a private key stored locally on the device, and generate the signed challenge with the private key for transmission in connection with the transaction request.

The level of confidence or security associated with such an authentication procedure may vary based on the quality of the public key authenticator. In turn, the quality of the public key authenticator may depend on the hardware and software capabilities of the mobile device and on the corresponding predetermined condition(s) that must be satisfied for the authentication to be completed. For example, an older mobile device may lack or have a lower quality camera, battery, processor, screen, connectivity, memory, and/or fingerprint sensor, and/or may suffer from analogous software deficiencies.

Accordingly, older and/or lower quality mobile devices with correspondingly less advanced or secure public key authenticators may inherently be limited in their ability to participate in financial transactions requiring a higher level of security.

BRIEF DESCRIPTION OF THE DISCLOSURE

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a payment authentication system is provided. The system includes a processor and a memory device storing computer-executable instructions thereon. The instructions cause the processor to: receive a signed challenge from a public key authenticator of a mobile device registered to a financial account of a user; receive a real-time transaction request and transaction data associated with the signed challenge; determine that the public key authenticator satisfies a basic integrity requirement; receive stopgap authenticator data including device security data and one or more of the following: a user personal identifier, a user personal credential, transaction history data of the user, and behavioral biometrics data generated at the user mobile device; compare the stopgap authenticator data to a hidden profile for the financial account to determine that a matching threshold is satisfied; based on the satisfaction of the matching threshold and of the basic integrity requirement, generate a stopgap authenticator token; and transmit the stopgap authenticator token and the transaction data for real-time transaction approval.

In another aspect, a computer-implemented method is provided. The method includes: receiving a signed challenge from a public key authenticator of a mobile device registered to a financial account of a user; receiving a real-time transaction request and transaction data associated with the signed challenge; determining that the public key authenticator satisfies a basic integrity requirement; receiving stopgap authenticator data including device security data and one or more of the following: a user personal identifier, a user personal credential, transaction history data of the user, and behavioral biometrics data generated at the user mobile device; comparing the stopgap authenticator data to a hidden profile for the financial account to determine that a matching threshold is satisfied; based on the satisfaction of the matching threshold and of the basic integrity requirement, generating a stopgap authenticator token; and transmitting the stopgap authenticator token and the transaction data for real-time transaction approval.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION OF THE DISCLOSURE

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

As used herein, the term "database" includes either a body of data, a relational database management system (RDBMS), or both. As used herein, a database includes, for example, and without limitation, a collection of data including hierarchical databases, relational databases, flat file databases, object-relational databases, object-oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL. However, any database may be used that enables the systems and methods to operate as described herein.

Example of Transaction Card Transaction Network

Figure 1:
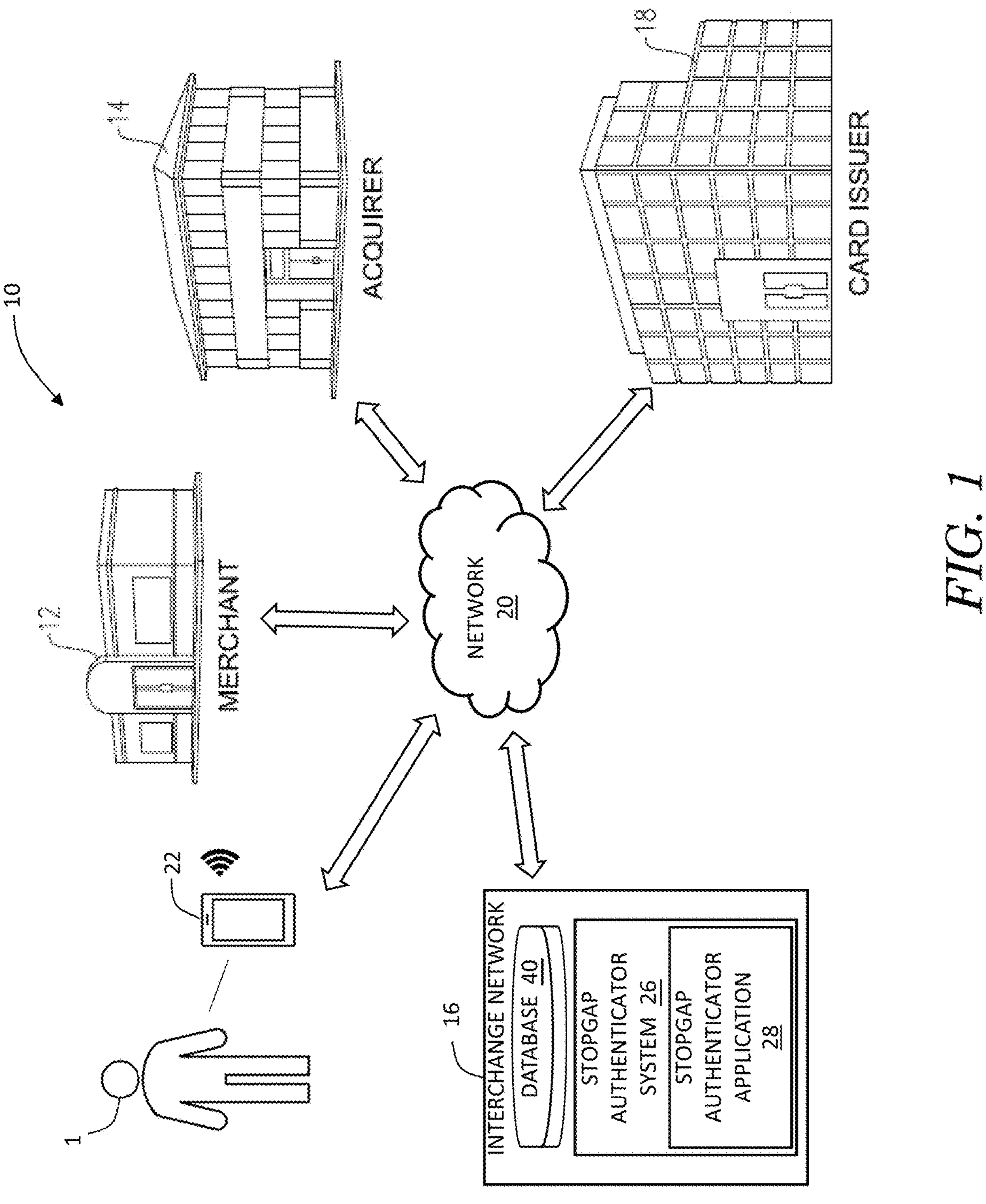
FIG. 1 is a block diagram of an example multi-party transaction network system that includes a stopgap authenticator system, in accordance with an aspect of the present invention.

FIG. 1 is a block diagram of an example multi-party transaction network system 10 that includes a stopgap authenticator system 26. The transaction card network system 10 facilitates providing interchange network services offered by an interchange network 16. In addition, the transaction card network system 10 enables transaction card transactions in which merchants 12, acquirers 14, and/or card issuers 18 do not need to have a one-to-one relationship. Although parts of the transaction card network system 10 are presented in one arrangement, other embodiments may include the same or different parts arranged otherwise, depending, for example, on authorization processes for purchase transactions, communication between computing devices, etc.

In one or more example embodiments, the transaction card network system 10 generally includes the merchants 12, the acquirers 14, the interchange network 16, and the issuers 18, coupled in communication via a network 20. The network 20 includes, for example and without limitation, one or more of a local area network (LAN), a wide area network (WAN) (e.g., the Internet, etc.), a mobile network, a virtual network, and/or any other suitable public and/or private network capable of facilitating communication among the merchants 12, the acquirers 14, the interchange network 16, and/or the issuers 18. In one or more embodiments, the network 20 may include more than one type of network, such as a private payment transaction network provided by the interchange network 16 to the acquirers 14 and the issuers 18 and, separately, the public Internet, which may facilitate communication between the merchants 12, the interchange network 16, the acquirers 14, and consumers, etc.

Embodiments described herein may relate to a transaction card system, such as a credit card payment system using the MASTERCARD® interchange network. (MASTERCARD is a registered trademark of Mastercard International Incorporated). The MASTERCARD® interchange network is a set of proprietary communications standards promulgated by Mastercard International Incorporated for the exchange of financial transaction data and the settlement of funds between financial institutions that are members of Mastercard International Incorporated.

In one or more example embodiments, the transaction card network system 10 also includes a cardholder device 22. The cardholder device 22 may be associated with a consumer or cardholder 1.

In a typical transaction card system, a financial institution called the "issuer" issues a financial account and associated transaction card, such as a credit card, to a cardholder, such as the cardholder 1. The cardholder 1 uses the transaction card to tender payment for a purchase from the merchant 12. In one or more example embodiments, the merchant 12 is typically associated with products, such as goods and/or services, that are offered for sale and are sold to the cardholder 1. The merchant 12 includes, for example, a physical location and/or a virtual location. A physical location includes, for example, a brick-and-mortar store, etc., and a virtual location includes, for example, an Internet-based store-front.

To accept payment with the transaction card, the merchant 12 must normally establish an account with a financial institution that is part of the transaction card network system 10. This financial institution is usually called the "merchant bank," the "acquiring bank," or the acquirer 14. When the cardholder 1 presents payment for a purchase with, for example, a transaction card, a digital wallet, or the like, the merchant 12 requests authorization from the acquirer 14 for the amount of the purchase. The request may be performed over the telephone but is usually performed through the use of a point-of-sale terminal that reads the cardholder's account information from a magnetic stripe, a chip, or embossed characters on the transaction card and/or wirelessly via the digital wallet and communicates electronically with the transaction processing computers of the acquirer 14. Alternatively, the acquirer 14 may authorize a third party to perform transaction processing on its behalf. In this case, the point-of-sale terminal will be configured to communicate with the third party. Such a third party is usually called a "merchant processor," an "acquiring processor," or a "third party processor."

Using the interchange network 16, computers of the acquirer 14 or merchant processor will communicate with computers of the issuer 18 to determine whether the cardholder's account is in good standing and whether the purchase is covered by the cardholder's available credit line. Based on these determinations, the request for authorization will be declined or accepted. If the request is accepted, an authorization code is issued to the merchant 12. When a request for authorization or transaction is accepted or approved, the available credit line of the cardholder's account is decreased, and subsequent settlement and record-keeping actions may be taken by the interchange network 16, merchant 12, card issuer 18 and otherwise.

In some cases—for example, where a digital wallet is used to perform the transaction—the cardholder device 22 may include a public key authenticator installed thereon. The authenticator may be stored on memory of the device 22 and/or in conjunction with the digital wallet, for example as illustrated respectively in FIG. 3 as elements 304, 306. The authenticator may generate a signed challenge authenticating the device in support of the transaction request. To trigger generation of the signed challenge, the cardholder 1 must ensure that predetermined conditions—usually established during a preceding registration phase with the interchange network 16 or a third party acting in concert with the network 16—of the public key authenticator are met. For example, the predetermined conditions may include entry of credentials, proof of device possession, display of a physical characteristic recognized as a biometric factor, or the like. Once the predetermined conditions are satisfied, the public key authenticator will unlock a private key stored locally on the device 22, and generate the signed challenge with the private key for transmission in connection with the transaction request.

The level of confidence or security associated with such an authentication procedure may vary based on the quality of the public key authenticator. In turn, the quality of the public key authenticator may depend on the hardware and software capabilities of the device 22 and on the corresponding predetermined condition(s) that must be satisfied for the authentication to be completed. For example, a device 22 may lack or have a lower quality camera, battery, processor, screen, connectivity, memory, and/or fingerprint sensor, and/or may suffer from analogous software deficiencies.

Accordingly, older and/or lower quality devices 22 with correspondingly less advanced or secure public key authenticators may inherently be limited in their ability to participate in financial transactions requiring a higher level of security.

In one or more example embodiments(s), the stopgap authenticator system 26 includes a processor, such as a digital processing unit, for executing instructions. The processor includes one or more processing units, for example, a multi-core configuration. In one or more embodiments, executable instructions are stored in a memory device of the stopgap authenticator system 26. The memory device is any device allowing information such as the digital wallet data stopgap authenticator application 28, executable instructions, and the like to be stored and retrieved. The memory device includes one or more non-transitory computer readable media. The components of the stopgap authenticator system 26 may comprise or be hosted with the processing system 102 without departing from the spirit of the present invention.

In one or more example embodiments discussed herein, and particularly in connection with relatively high risk transactions, the cardholder 1 and/or cardholder device 22 may provide additional stopgap authenticator data and a signed authenticator challenge to the stopgap authenticator system 26. In one or more embodiments, a portion of the additional stopgap authenticator data may be provided from the database maintained by the server system 30 and/or another aspect of the interchange network 16 (see FIG. 1). The stopgap authenticator system 26 is configured to determine that the public key authenticator satisfies a basic integrity requirement, and to compare the stopgap authenticator data to a hidden profile for the financial account of the cardholder 1 to determine that a matching threshold is satisfied. Where these are satisfied, the stopgap authenticator system 26 is configured to issue and transmit a stopgap authenticator token with the transaction request for approval, as discussed in more detail below.

Particularly where a signed authenticator challenge generated by the device 22 according to prior art methods would have been insufficient for approval of a high-risk request, embodiments of the present method and corresponding stopgap authenticator token may enable such approval, thereby improving cardholder experience and reducing unnecessary denials.

Exemplary Computer Systems

Figure 2:
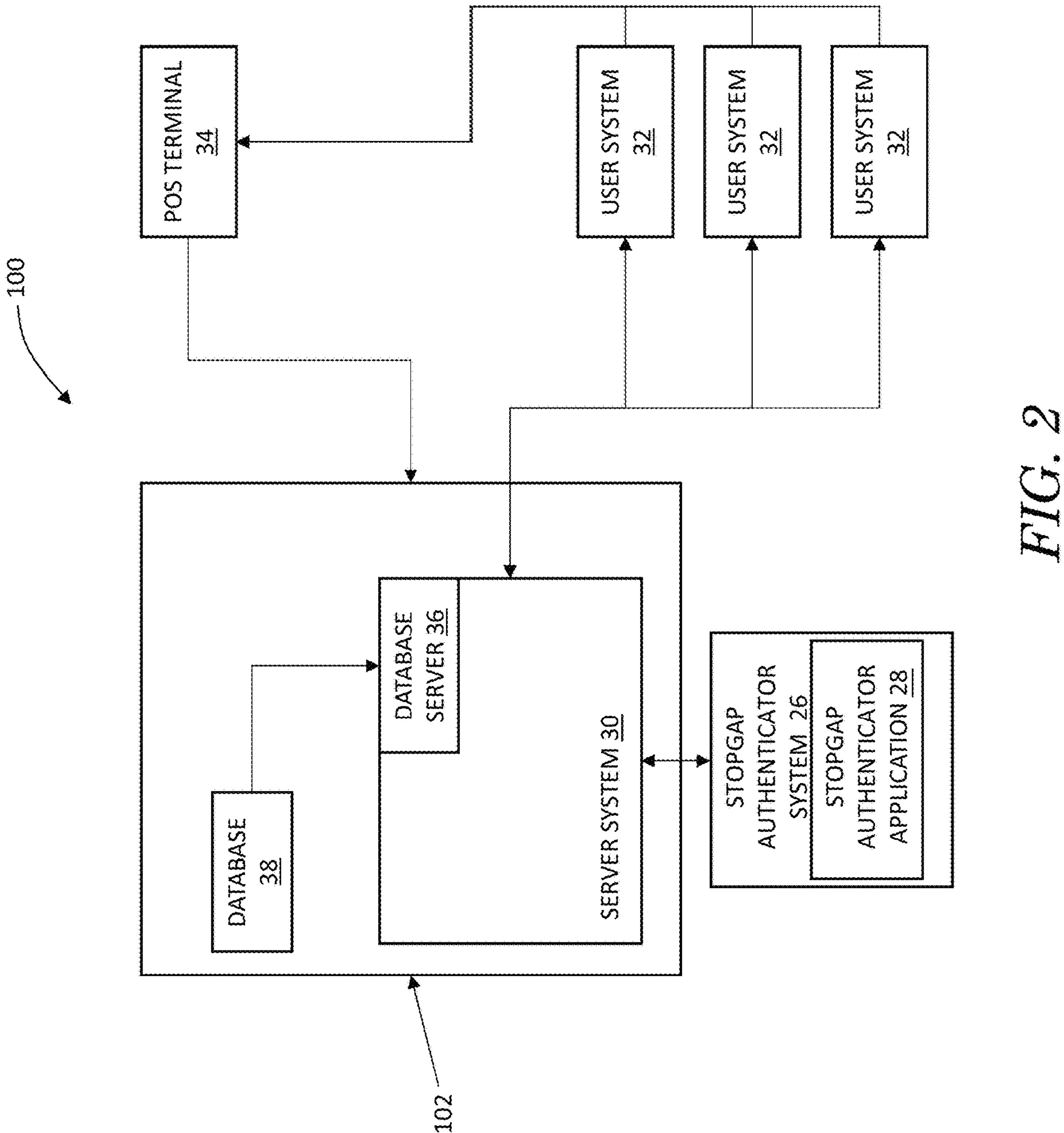
FIG. 2 is a simplified block diagram of an example payment network, including the stopgap authenticator system of FIG. 1.

FIG. 2 is a simplified block diagram of an example payment network 100 having transaction processing system 102 for processing transaction requests extending public key authenticator viability using the stopgap authenticator system 26.

In one or more embodiments, the stopgap authenticator token generated by the stopgap authenticator system 26 comprises a one-time self-sovereign identity (SSI) token (e.g., in JSON format). The token may include random alphanumeric characters, optionally encrypted. The token may be decrypted and otherwise decoded and matched against known information by the transaction processing system 102 and/or issuer 18 in connection with a transaction request to enable approval of a transaction request which may have been denied if based solely or primarily on a signed authenticator challenge. However, the token may be otherwise constructed within the scope of the present invention.

In one or more embodiments, the payment network 100 is similar to the transaction card network system 10 (shown in FIG. 1). In one or more example embodiments, the payment network 100 includes a plurality of computing devices connected in accordance with the present disclosure. The payment network 100 includes a server system 30 of the processing system 102 in communication with a point-of-sale (POS) terminal 34. The POS terminal 34 may be located, for example, at a merchant location 12 (shown in FIG. 1). The server system 30 is also in communication with a plurality of user systems 32 associated with cardholders (i.e., consumers).

In an embodiment, the user systems 32 are mobile computing devices, such as the first cardholder device 22 (shown in FIG. 1), including digital wallets. It is contemplated, however, that the user systems 32 can be any devices, such as mobile phones, Smartphones, personal digital assistants (PDAs), key fobs, and/or computers, such that server system 30 is accessible to the user systems 32 using the Internet. The user systems 32 are interconnected to the Internet through one or more of many interface types including, for example, a network, such as a wireless network adapter or a wireless data transceiver for use with Bluetooth communication, radio frequency communication, near field communication (NFC), and/or with a mobile phone network, Global System for Mobile communications (GSM), 3G, 4G, 5G, or other mobile data network, and/or Worldwide Interoperability for Microwave Access (WiMax) and the like. The user systems 32 may be any device capable of interconnecting to the Internet including an Internet connected phone, a PDA, or any other suitable web-based connectable equipment.

In one or more example embodiments, the processing system 102 includes one or more POS terminals 34, which may be connected to the user systems 32 and the server system 30. The POS terminal(s) 34 may be interconnected to the Internet (or any other network that allows the POS terminal(s) 34 to communicate as described herein) through many interfaces including a network, such as a local area network (LAN) or a wide area network (WAN), dial-in-connections, cable modems, wireless modems, and special high-speed ISDN lines. The POS terminal(s) 34 are any device capable of interconnecting to the Internet and including an input device capable of reading information from a cardholder's financial transaction card. In one or more embodiments, the POS terminal 34 may be a cardholder's personal computing device, such as when conducting an online purchase through the Internet. As used herein, the terms POS device, POS terminal, and point-of-interaction device are used broadly, generally, and interchangeably to refer to any device in which a cardholder interacts with a merchant to complete a financial transaction.

A database server 36 is connected to a database 38, which is configured to store information on a variety of matters. In one or more embodiments, the database 38 is a centralized database stored on the server system 30 and can be accessed by potential users at one of the user systems 32 by logging onto the server system 30 through one of the user systems 32. In an alternative embodiment, the database 38 is stored remotely from the server system 30 and may be a distributed or non-centralized database.

In one or more embodiments, the database 38 may include a single database having separated sections or partitions or may include multiple databases, each being separate from each other. The database 38 may store transaction data generated as part of sales activities and savings activities conducted over the processing network including data relating to merchants, account holders or customers, issuers, acquirers, savings amounts, savings account information, and/or purchases made. The database 38 may also store account data including at least one of a cardholder name, a cardholder address, an account number, and other account identifier. The database 38 may also store merchant data including a merchant identifier that identifies each merchant registered to use the network, and instructions for settling transactions including merchant bank account information. The database 38 may also store purchase data associated with items purchased by a cardholder from a merchant, and authorization request data. The database 38 may also store digital wallet data 306, device 22 information including public key authenticator data, cardholder hidden profile(s) for authentication, and other data involved with processing transactions involving one or more cardholders.

In one or more embodiments, the cardholder hidden profile(s) are generated and stored, and user systems 32 are configured to provide, generate and store data described herein, according to and in compliance with SSI principles. The hidden profile(s) may be generated and/or stored confidentially and/or without the knowledge of the cardholder and/or the public. For example, registration by a cardholder for stopgap authenticator services described herein may include data collection (e.g., from the cardholder, cardholder device and/or from one or more devices of the payment network 100) and refinement, storage and/or analyses thereof, in each case without exposing (e.g., at a user interface or in the memory of the device) such activities or data types to the cardholder, cardholder device or public more generally. Because the hidden profile(s) and their constituent datapoints, data and embedded pattern(s) are unknown to the cardholders and/or public, fraudulent mimicking of those attributes may be made more difficult.

In one or more example embodiments, one of the user systems 32 may be associated with the cardholder 1 (shown in FIG. 1), while the POS terminal 34 may be associated with the merchant 12 (shown in FIG. 1) or may be a computer system and/or mobile system used by the cardholder 1 while making an on-line purchase or payment. The server system 30 may be associated with the interchange network 16 or a payment processor. In one or more example embodiments, the server system 30 is associated with a financial transaction processing network, such as the interchange network 16, and may be referred to as an interchange computer system. The server system 30 may be used for processing transaction data. In addition, the user systems 32 and the POS terminal 34 may include a computer system associated with at least one of a merchant, an online bank, a bill payment outsourcer, an acquirer bank, an acquirer processor, an issuer bank associated with a transaction card, an issuer processor, a remote payment processing system, and/or a biller.

In one or more example embodiments, the processing system 102 is in communication with the stopgap authenticator system 26 and the stopgap authenticator application 28, which may be associated with the interchange network 16 or with an outside third party in a contractual relationship with the interchange network 16. For example, in one or more embodiments, the stopgap authenticator system 26 may be associated with and/or implemented by a payment services provider implementing Fast Identity Online (FIDO®) online payment authentication services (FIDO® is a registered trademark of Fido Alliance, Inc.), for example in accordance with active implementations as of the date of first filing of the present disclosure.

In one or more example embodiments, the stopgap authenticator system 26 receives requests from a cardholder, such as the cardholder 1, to authenticate the device 22 in connection with a putative financial transaction implemented via the device 22. The request will typically be accompanied by a signed challenge generated by a public key authenticator of the device 22. Existing flows may determine that the public key authenticator and/or signed challenge do not meet a security threshold, for example because a security level of the public key authenticator does not satisfy a security requirement for the transaction request. Such existing flows may accordingly reject the transaction or pass along a recommendation for denial of the transaction. However, in one or more embodiments of the present invention, the stopgap authenticator system 26 may perform additional steps to enhance the viability of the public key authenticator in connection with the transaction request, decreasing the chances of an unnecessary denial of the transaction, as discussed in more detail below.

In one or more embodiments, the stopgap authenticator system 26 and/or the stopgap authenticator application 28 are also in communication with a merchant system and/or an issuer system (not shown) and/or the POS terminal 34 of the merchant 12. It is noted that the payment network 100 may include more, fewer, or alternative components and/or perform more, fewer, or alternative actions, including those discussed elsewhere herein.

Figure 3:
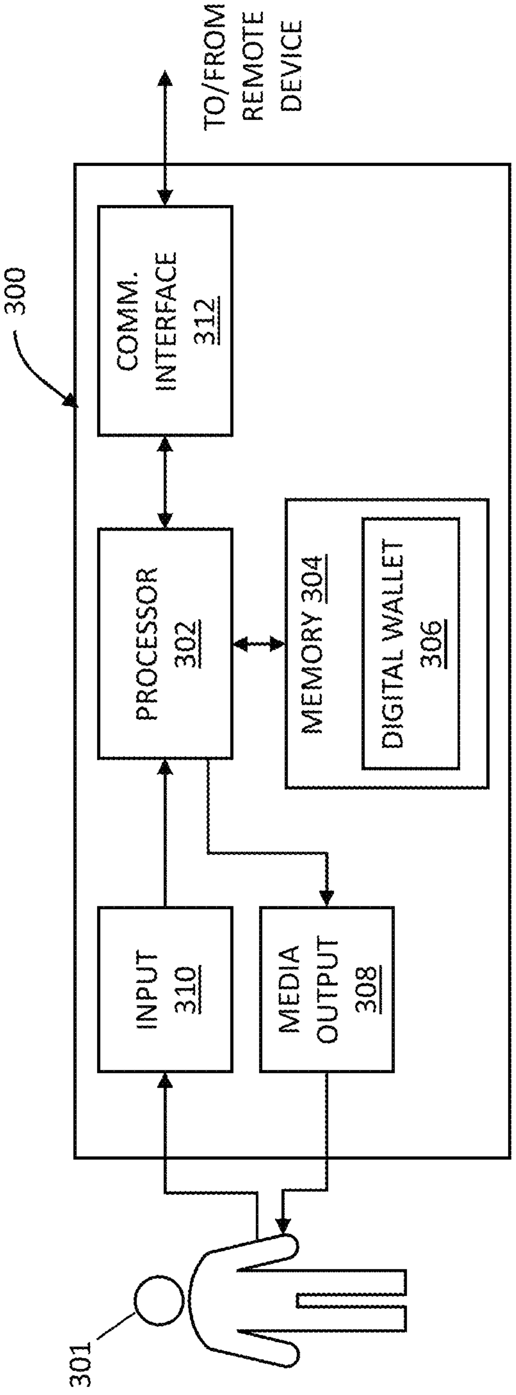
FIG. 3 is an example configuration of a user system operated by a user, such as a cardholder shown in FIG. 1.

FIG. 3 is an example configuration of a user system 300 operated by a user 301, such as the cardholder 1 (shown in FIG. 1). In one or more embodiments, the user system 300 is a client system 32 and/or a merchant POS terminal 34 (shown in FIG. 2) and/or is embodied by a device 22.

In one or more example embodiments, the user system 300 includes a processor 302 for executing instructions. In one or more embodiments, executable instructions are stored in a memory device 304. The processor 302 includes one or more processing units, for example, a multi-core configuration. The memory device 304 is any device allowing information such as the digital wallet 306, executable instructions, a public key authenticator and/or the like to be stored and retrieved. The memory device 304 includes one or more non-transitory computer readable media.

The user system 300 also includes at least one media output component 308 for presenting information to the user 301. The media output component 308 is any component capable of conveying information to the user 301. In one or more embodiments, the media output component 308 includes an output adapter such as a video adapter and/or an audio adapter. An output adapter is operatively coupled to the processor 302 and operatively connectable to an output device such as a display device, such as a liquid crystal display (LCD), organic light emitting diode (OLED) display, or "electronic ink" display, or an audio output device, such as a speaker or headphones.

In one or more embodiments, the user system 300 includes an input device 310 for receiving input from the user 301. The input device 310 may include, for example, a touch sensitive panel, a touch pad, a touch screen, a stylus, a gyroscope, an accelerometer, a position detector, a keyboard, a pointing device, a mouse, or an audio input device. A single component such as a touch screen may function as both an output device of the media output component 308 and the input device 310. The user system 300 may also include a communication interface 312, which is communicatively connectable to a remote device such as the server system 30 and/or the POS terminal 34 (shown in FIG. 2). The communication interface 312 may include, for example, a wired or wireless network adapter or a wireless data transceiver for use with Bluetooth communication, radio frequency communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 304 are, for example, computer readable instructions for providing a user interface to the user 301 via the media output component 308 and, optionally, receiving and processing input from the input device 310. A user interface may include, among other possibilities, a web browser and various software applications, such as a digital wallet application. Web browsers enable users, such as the user 301, to display and interact with media and other information typically embedded on a web page or a website from the server system 30. The various software applications allow the user 301 to interact with a server application, such as the stopgap authenticator application 28, from the server system 30 to facilitate receiving/providing various services.

In one or more example embodiments, the user system 300 is a user computing device from which the user 301 engages with a digital wallet 306, an online merchant (e.g., the merchant 12 shown in FIG. 1), an interchange network (e.g., the interchange network 16 shown in FIG. 1), and an issuer of a transaction card (e.g., the issuer 18 shown in FIG. 1) to perform a financial transaction using, for example, the cardholder's financial account.

Figure 4:
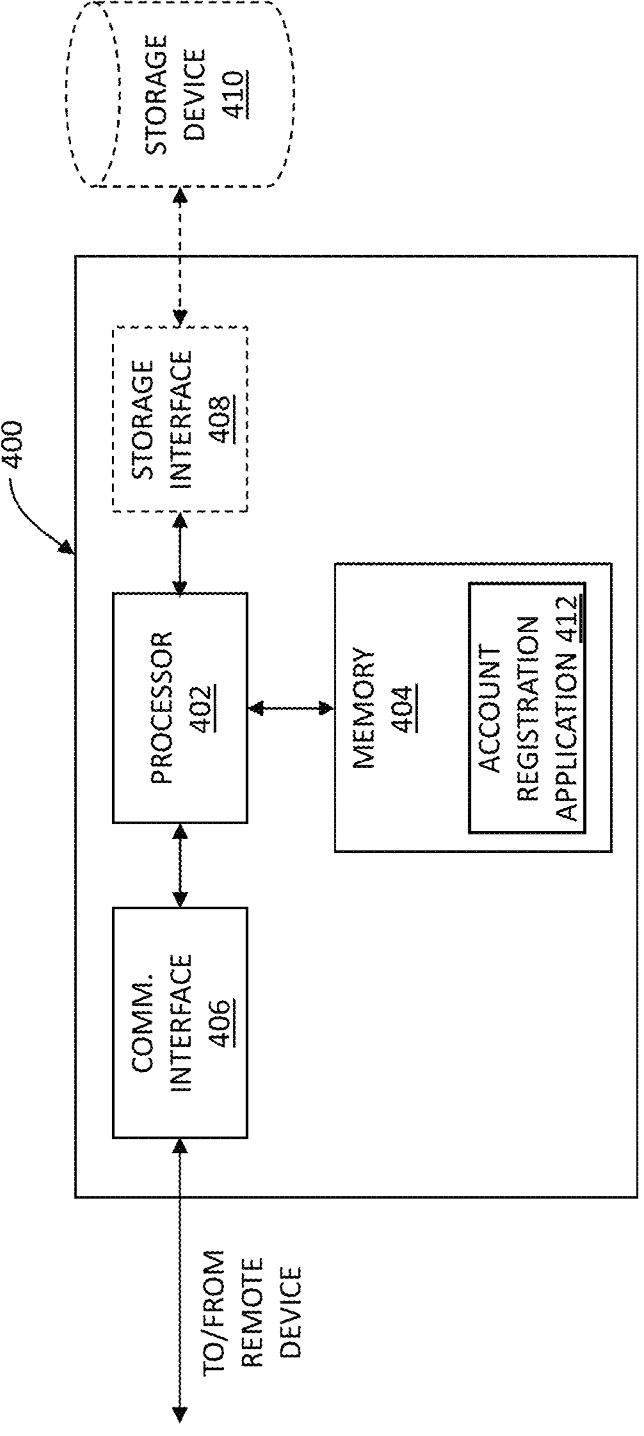
FIG. 4 is an example configuration of a server system, such as a server system shown in FIG. 2.

FIG. 4 is an example configuration of a server system 400, such as the server system 30 (shown in FIG. 2). The server system 400 may include and/or operate in conjunction with the stopgap authenticator system 26 (shown in FIG. 1). In one or more example embodiments, the server system 400 includes a processor 402 for executing instructions. The instructions may be stored in a memory 404, for example. The processor 402 includes one or more processing units (e.g., in a multi-core configuration) for executing the instructions. The instructions may be executed within a variety of different operating systems on the server system 400, such as UNIX, LINUX, Microsoft Windows®, etc. More specifically, the instructions may cause various data manipulations on data stored in a storage device 410 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C #, C++, Java, or other suitable programming languages, etc.).

The processor 402 is operatively coupled to a communication interface 406 such that the server system 400 can communicate with a remote device such as a user system 300 (shown in FIG. 3), server system 400, stopgap authenticator system 26, merchants 12, acquirers 14, and/or card issuers 18. For example, the communication interface 406 may receive communications from a client system 32 via the Internet, as illustrated in FIG. 2.

The processor 402 is operatively coupled to the storage device 410. The storage device 410 is any computer-operated hardware suitable for storing and/or retrieving data. In one or more embodiments, the storage device 410 is integrated in the server system 400. In other embodiments, the storage device 410 is external to the server system 400 and is similar to the database 40. For example, the server system 400 may include one or more hard disk drives as the storage device 410. In other embodiments, the storage device 410 is external to the server system 400 and may be accessed by a plurality of server systems 400. For example, the storage device 410 may include multiple storage units such as hard disks or solid-state disks in a redundant array of inexpensive disks (RAID) configuration. The storage device 410 may include a storage area network (SAN) and/or a network attached storage (NAS) system.

In one or more embodiments, the processor 402 is operatively coupled to the storage device 410 via a storage interface 408. The storage interface 408 is any component capable of providing the processor 402 with access to the storage device 410. The storage interface 408 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 402 with access to the storage device 410.

The memory 404 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

In an embodiment, the memory 404 includes an account registration application 412 stored thereon that, when executed by the processor 402, enables the server system 400 to handle registration requests from cardholders, such as the cardholder 1 (shown in FIG. 1), to register for stopgap authenticator services provided by the server system 400

(e.g., the stopgap authenticator system 26). Using the account registration application 412, the cardholder 1 and/or other entities may create an account or otherwise register for stopgap authenticator services in connection with processing financial transactions. The account operates to allow the cardholders to provide data discussed herein to extend or enhance the viability of the public key authenticator of the cardholder device 22.

In one or more example embodiments, server system 400 comprises and/or operates in conjunction with the stopgap authenticator system 26, coupled in communication with one or more of the user system 32 (shown in FIG. 2), the interchange network 16, and/or the merchant 12 during a financial transaction involving, for example, the public key authenticator of the device 22, which may be comprise or operate in conjunction with the digital wallet 306 (shown in FIG. 3) of a user, such as the cardholder 1 (shown in FIG. 1). The server system 400 checks for financial accounts, associated hidden cardholder profile(s), and account information updates and/or limitations in connection with performing a financial transaction.

In one or more example embodiments, the stopgap authenticator system 26 is programmed to communicate with one or more client systems, such as the first cardholder device 22, via the account registration application 412 (shown in FIG. 4) to receive user and device identification data to facilitate activating and registering the cardholders.

In particular, the user activation process creates a hidden user profile describing aspects of the cardholder, the cardholder's behavioral characteristics, the cardholder device and/or software, firmware and hardware on/comprising the device, the cardholder's transactions, cardholder identification information, and the like for use with the stopgap authenticator system 26 and/or the stopgap authenticator application 28. The user, such as the cardholder 1, enters and/or otherwise provides and/or consents to transmission of such user data 506 to the stopgap authenticator system 26. In one or more embodiments, all or some of the activation and/or stopgap authenticator data are obtained with cardholder consent from database(s) of the interchange network 16. More detailed examples of the data provided by and/or used to construct the hidden profile for each cardholder are discussed below. Each hidden profile is stored in the database 40. The stopgap authenticator system 26 generates a user account associated with the hidden profile in the database 40, enabling access and analysis thereagainst in connection with subsequent transaction requests, discussed in more detail below.

Generation of each hidden profile may include receipt and/or construction of a biometric profile corresponding to each cardholder. The biometric profile may include, for example, biometrics of a respective user or cardholder. The biometrics of a respective user include, for example, one or more biometric scans or digital representations of a physical feature(s) of the user that is to be validated during account setup and/or in connection with transaction requests. The physical feature(s) may include, for example, a fingerprint image, a voice recording, a retinal image, facial recognition, palm print image, iris recognition, and the like. Feature data from the biometric scan or digital representation may be extracted to select one or more features of interest. The respective biometric profile may be stored, for example, in the corresponding hidden profile of the database 40. The stop gap authenticator system 26 receives the one or more biometric scans or digital representations of the physical feature(s) from the first cardholder device 22 and/or a database accessible to the interchange network 16 and uses them to generate the respective biometric profiles and/or validate the one or more biometric scans or digital representations against already stored biometric profiles.

Other biometric or behavioral data may also or alternatively give rise to portion(s) of the hidden profile of an individual cardholder. Such biometrics and/or behavioral biometrics data may include, for example: height and/or movement patterns of the cardholder device; data entry patterns of the user at a user interface (e.g., input device 310) of the cardholder device; objects frequently found proximate the photographic element of the cardholder device; and other data reflecting behavior and/or physical states of the individual, physical states of the individual's surroundings and/or changes in those physical states. In additional examples, the data may include or be analyzed to determine: phone position in three-dimensional space indicating posture; phone movements indicating patterns of movement of the cardholder; timestamp data associated with one or more recorded system event(s) or sensor data acquisitions, which may be associated with normal behavioral patterns of cardholder; proximity of at least one cardholder device to another object or entity; speed of activities of the cardholder recorded at a user interface (e.g., input device 310), for instance speed and/or quality of input such as typing; vocal patterns; movement patterns and/or locations determined via geolocation element of a mobile device (e.g., Smartphone) comprising the device 22; voice characteristics; key stroke patterns; changes in device level parameters such as media access control (MAC) identification; video and/or microphone sensor data captured by the cardholder device; behavioral patterns of the cardholder with respect to handling a mobile device at a particular time and/or in connection with a particular task, and/or other such information and/or a combination of any of the foregoing.

The hidden profile may be developed and/or the steps for stopgap authenticator token generation may be performed at least in part based on machine learning techniques. In one or more embodiments, physical phenomena may be observed and patterns or correlations may be determined through artificial intelligence and machine learning techniques in order to perform feature extraction and/or otherwise develop the hidden profile. For example, actions of an individual cardholder may be observed through one or more types of sensor input, such as where a sensor of a user interface (e.g., input device 310) observes typing actions revealing habits and patterns of an individual, a gyroscope and/or accelerometer observes phone movement(s) revealing actions that frequently occur in connection with a particular circumstance or stimulus, a location determining element observes proximities of a device to other device(s) and/or entities which reveal habits or patterns of the individual cardholder, and so on and so forth. Machine learning techniques may, for example, incorporate a decision tree, deep neural net or the like configured to authenticate the individual cardholder by comparing such developed patterns against collected stopgap authenticator data.

One of ordinary skill will appreciate that such machine learning may utilize one or more supervised and/or unsupervised learning techniques, such as where supervised learning is used to train a convolutional neural net to recognize objects frequently in proximity with a cardholder, or where unsupervised learning is used in connection with clustering techniques to correlate data elements commonly appearing together in the life of a particular individual cardholder.

In one or more embodiments, the stopgap authenticator system 26 facilitates communication between the stopgap authenticator application 28 and the digital wallet 306 (shown in FIG. 3) to send, receive, and store information related to the construction of cardholder hidden profiles and authentication in connection with financial transactions.

In one or more embodiments, the stopgap authenticator system 26 also facilitates registration of the cardholder device 22 and cardholder 1 in association with the financial account of the cardholder 1. The stopgap authenticator system 26 may, in connection with such registration, reconfigure the digital wallet 306 and/or require installation of an additional mobile application on the device 22 for collection, storage, management and transmission of one or more of the signed challenge, transaction data, basic integrity device data, and stopgap authenticator data discussed in more detail above and throughout this disclosure. In one or more embodiments, the device 22 may accordingly be configured for continuous and/or intermittent collection and storage of sensor and sensitive personal data regarding the cardholder 1 and device 22 necessary to construct and maintain the corresponding hidden profile and to evaluate data corresponding to individual transaction requests against the hidden profile and otherwise.

For example, the device 22 may be configured by the stopgap authenticator system 26 to: collect unique identifiers and documentation (e.g., via prompting the cardholder 1 at media output device 308 for direct submission and/or consent for retrieval) during the registration phase and/or intermittently in connection with authentication events for discrete financial transactions; activate sensors (e.g., input devices 310) periodically or over periods of time to collect data necessary to develop biometric and behavioral data and patterns during the registration phase and/or intermittently in connection with authentication events for discrete financial transactions; collect device data (e.g., identifiers, software/firmware versions, hardware identifiers, etc.), and/or to otherwise collect and transmit the data from the cardholder 1 and/or device 22 or the consent to obtain same, in each case as necessary to construct the hidden profile(s), authenticate financial transactions, and otherwise complete transactions described hereunder.

Following registration, authentication data comprising a signed challenge, transaction data, basic integrity device data, and stopgap authenticator data are transmitted to and validated by the stopgap authenticator system 26 against the hidden profile and related transaction standards maintained by the stopgap authenticator system 26. The stopgap authenticator system 26 either issues or declines to issue a stopgap authenticator token for a transaction based on a comparison of the authentication data against the hidden profile and such other transaction standards, as discussed in more detail below. For example, if the data match the hidden profile and other standards within a given threshold, the stopgap authenticator token may be generated and passed along to an issuer 18 for evaluation and approval or denial of the transaction request. However, if the data do not match the hidden profile or other standards within the given threshold, the stopgap authenticator system 26 may decline the transaction and/or decline to issue the stopgap authenticator token. Also or alternatively, if the data do not match the hidden profile or other standards within the given threshold, the stopgap authenticator system 26 may initiate a secondary data collection and/or authentication process for updating the hidden profile to accommodate typical post-registration changes to the authentication data, also as discussed in more detail below.

Exemplary Computer-Implemented Methods

Figure 5:
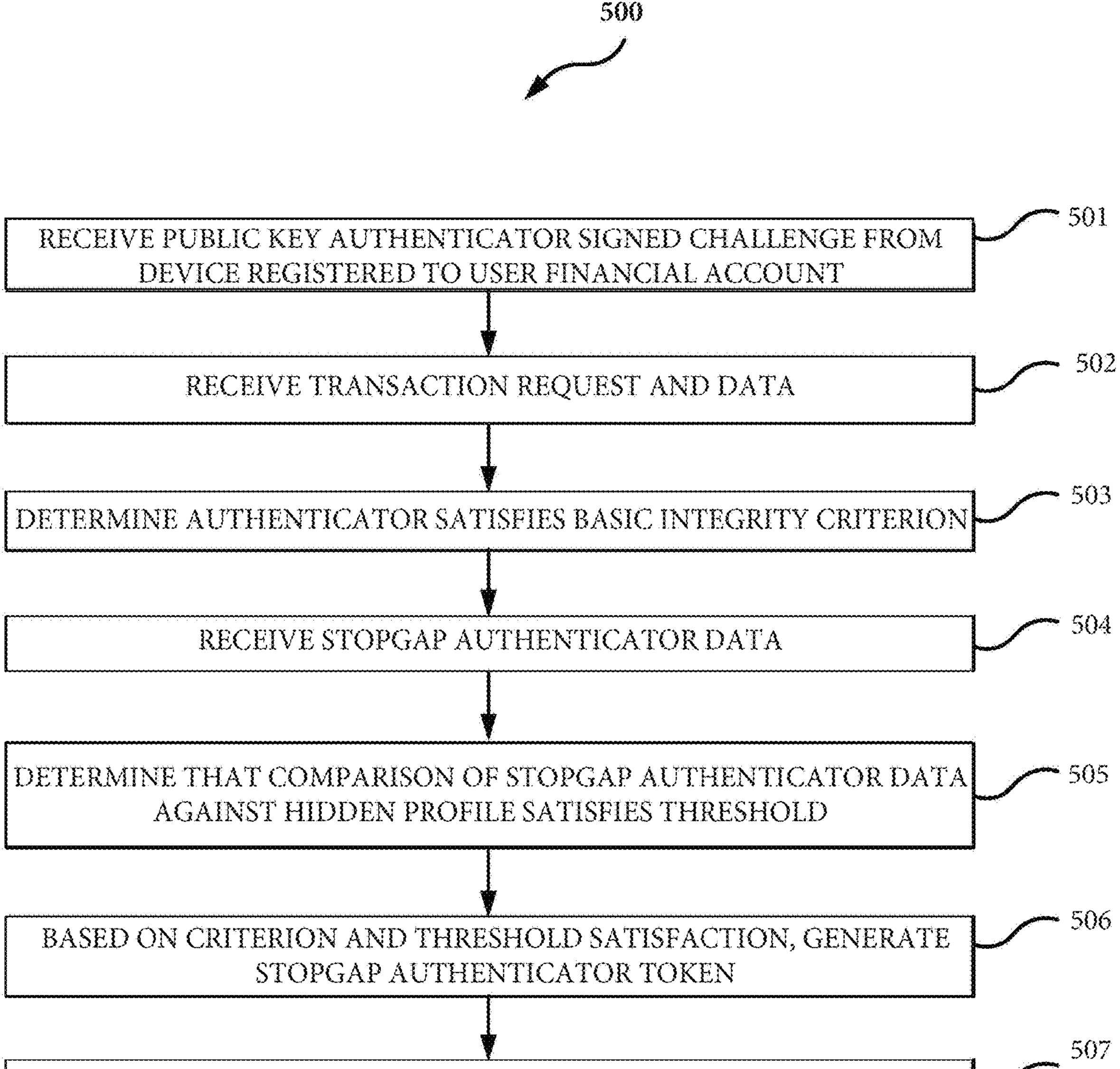
FIG. 5 is a flowchart illustrating an exemplary computer-implemented method for payment authentication using the stopgap authenticator system of FIG. 1, in accordance with one or more embodiments of the present disclosure.

FIG. 5 is a flowchart illustrating an exemplary computer-implemented method 500 for payment authentication, in accordance with one or more embodiments of the present disclosure. The operations described herein may be performed in the order shown in FIG. 5 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 500 is described below, for ease of reference, as being executed by exemplary devices and components introduced with the embodiments illustrated in FIGS. 1-4. In one or more embodiments, the computer-implemented method 500 is implemented by the stopgap authenticator system 26 (shown in FIG. 1), including through collection and exchanges of data by and with the cardholder device 22 and database 40. While operations within the computer-implemented method 500 are principally described below in connection with the stopgap authenticator system 26, cardholder device 22 and database 40, according to some aspects of the present invention the computer-implemented method 500 may be implemented using any other computing device(s) and/or system(s) through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

The cardholder may initially register the cardholder device for a stopgap authenticator service and corresponding enhancement of the device's public key authenticator viability. In one or more embodiments, the cardholder registrant connects to a stopgap authenticator system via an interchange network, e.g., via a stopgap authenticator application, which is configured for direct connection to the stopgap authenticator system. Alternatively, the cardholder registrant may access the stopgap authenticator system via a webservice providing stopgap authenticator service registration via use of a web browser. The stopgap authenticator application may be stored in a cloud-based interface, which may include cloud storage capability as well as any cloud-based application programming interface (API) that facilitates communication between a cardholder registrant computing device and the stopgap authenticator system.

During enrollment or registration, the cardholder registrant may provide (and/or provide consent for retrieval of) enrollment data including basic information about itself (e.g., name, address, phone number, etc.) and, in one or more embodiments, provide information regarding the cardholder registrant's computing device (for example, by providing a hardware identifier, a SIM identifier, a mobile telephone number, and/or other computing device identifier). In one or more embodiments, information regarding, identifying and/or registering the public key authenticator of the cardholder device for use in connection with financial transactions is also provided to and/or conducted with the stopgap authenticator system.

It is noted that the stopgap authenticator service account can be linked to other MASTERCARD® and/or issuer services if the cardholder registrant is already signed up for other unrelated services.

In one or more embodiments, the information obtained from and/or at the behest of the cardholder registrant during the enrollment process includes product and/or service preferences, requirements data, and/or other information. The cardholder registrant may also provide information concerning its associated financial account(s). For example, the associated financial account(s) may include one or more transaction cards (e.g., a bank credit card primary account number, debit card primary account number, loyalty card primary account number, gift card primary account number, and the like) issued to or held by the cardholder and which may be linked to a hidden profile (discussed below) along with the cardholder device and the public key authenticator to enable authentication of financial transactions.

The stopgap authenticator system may also authenticate the cardholder registration and obtain registration information required to build a hidden profile on the account(s) and cardholder registrant. Initial authentication of the cardholder registrant may include, for example, transmission of a one-time code to the cardholder registrant computing device, such as the first cardholder device via Short Message Service (SMS), e-mail, through a call center communication, or the like. Alternatively, or in addition, the cardholder registrant may be asked to input a string of characters indicated by a code printed on the signature panel of the cardholder's transaction card. The signature panel code may be, for example, a card verification code (CVC) value. Optionally, the method 500 may include an additional operation for authenticating the cardholder registrant offline. For example, and without limitation, the stopgap authenticator system may provide an offline PIN to the cardholder registrant via mail.

It should be appreciated that other known methods for authentication may also or alternatively support registration of the cardholder registrant with the stopgap authenticator service within the scope of the present invention. Such method(s) for authentication may compare the provided data against financial account and cardholder data already stored by the interchange network and/or card issuer and, if such comparison is successful, link the account, cardholder and device to the stopgap authentication service.

Information which may be gathered by the cardholder device or otherwise submitted to the stopgap authenticator service to support registration and generation of the hidden profile for the corresponding account(s) and device, and method(s) for generating the hidden profile, are discussed in more detail in preceding sections above, and includes the datapoints discussed in more detail below in connection with the method 500. Generation of the hidden profile in connection with registration is also described in more detail above, and preferably occurs at least initially during the registration process. The hidden profile may be updated periodically, as discussed in more detail below. Steps 500 for using the stopgap authenticator service for authentication of financial transactions are discussed below.

Referring to step 501, a public key authenticator signed challenge may be received from the cardholder device registered to the cardholder financial account. Referring to step 502, the signed challenge may be in connection and/or received with a request for a financial transaction and corresponding transaction data from the cardholder device. The signed challenge, request and transaction data may be received at or via an interchange network and/or stopgap authenticator system, and may include or be indicative of a type and/or level of technological capability and/or security of the public key authenticator used to generate the signed challenge. For example, the information comprising the signed challenge may itself provide such indications and/or the registration data provided by and/or with the consent of the cardholder registrant (e.g., stored in the database and/or hidden profile) may indicate same.

It should also be noted that the stopgap authenticator system may receive and perform steps of the method 500 contingent on a determination that the signed challenge is not, itself, sufficient to satisfy security requirements associated with the transaction request at issue. That is, the interchange network and/or stopgap authenticator system may, upon initial receipt of a transaction request, determine whether the signed challenge, public key authenticator and/or other provided authentication information (e.g., traditional authentication data discussed above) are sufficient to satisfy a risk, security and/or priority level associated with the transaction. If so, a stopgap authenticator token may be unnecessary for authentication of the transaction. If not, the steps of the method 500 may be performed for issuance of the stopgap authenticator token.

Referring to step 503, it may be determined whether the public key authenticator satisfies a basic integrity criterion. The determination may be made at or via the interchange network and/or stopgap authenticator system.

In one or more embodiments, basic integrity criteria may be multi-factorial, and may be evaluated according to a variety of decisioning algorithms comprising or incorporating, for example, decision trees, weight functions such as weighted summations, neural networks and/or other technologies for evaluating multiple factors to determine satisfaction of a threshold requirement. For example, the decisioning algorithm may take into account one or more of the following data types for the public key authenticator of the cardholder mobile device: certification by a predetermined entity; secure private key storage; secure private key cryptographic management practices; user presence verification; protection against replay attacks; and device attestation. Such public key authenticator data may be retrieved from the database and/or received from the cardholder device during registration, in connection with the transaction request, or otherwise within the scope of the present invention.

For example, checking certification by a predetermined entity might include verifying whether the authenticator (e.g., FIDO® authenticator) has been certified by the FIDO Alliance. Certification ensures that the authenticator meets the industry standards for security and interoperability. Further, checking secure private key storage may include examining how cryptographic keys are generated, stored, and managed within the authenticator of the cardholder device. The check may seek to ensure that private keys are securely stored and that key management practices follow established cryptographic principles. Still further, checking for user presence verification may include ensuring that the authenticator enforces user presence verification during authentication. User presence ensures that the user is physically present during the authentication process, preventing unauthorized access. Yet still further, checking protection against replay attacks may include checking if the authenticator implements protection mechanisms against replay attacks. This is important for preventing attackers from capturing and reusing authentication messages. Yet still further, checking device attestation may include assessing whether the authenticator supports device attestation and/or providing evidence about the security properties of the device to relying parties (e.g., issuers). One of ordinary skill will appreciate that alternative and additional aspects of the authenticator may be considered in the basic integrity check within the scope of the present invention.

Referring to step 504, stopgap authenticator data may be received. The stopgap authenticator data may be received at or via the interchange network and/or stopgap authenticator system in connection with the transaction request. The stopgap authenticator data may be received from the cardholder device on which the public key authenticator is installed and/or which originated or participated in origination of the transaction request and/or from devices of the interchange network.

The stopgap authenticator data may include device security data and one or more of the following: a user personal identifier, a user personal credential, transaction history data of the user, and behavioral biometrics data generated at the user mobile device. The type(s) and extent of stopgap authenticator data may be pre-configured in connection with registration and/or may vary with data available to and permitted to be divulged by the cardholder device in connection with a given transaction request.

The device security data may include one or more of: secure firmware boot verification; firmware anti-tampering and code integrity check; physical security feature check; secure communication verification; and firmware version, update and patch check. For example, checking secure firmware boot verification may include checking the status of secure boot mechanisms to ensure that only signed and authenticated firmware is loaded during the boot process. This may involve accessing and verifying secure boot-related registers or configurations. Further, checking firmware anti-tampering and code integrity may include implementing code integrity checks to verify that the firmware's code has not been tampered with. This can involve calculating and comparing cryptographic hashes (e.g., SHA-256) of critical firmware components and comparing them against known good values. Still further, the physical security feature check may include implementing code to check for physical security features. This could involve using hardware-based features, such as tamper detection or secure enclave capabilities. Yet still further, secure communication verification may include checking for the use of secure communication protocols, such as by verifying that network communication uses secure protocols such as transport layer security (TLS) and that cryptographic best practices are followed. Yet still further, checking firmware version and performing an update and patch check may include implementing a mechanism to check the firmware version and verify all latest patches and updates are applied. This may involve querying version information or comparing it against the known secure version issued by original equipment manufacturers and/or software provider(s).

Further, examples of user personal identifiers and credentials include: username and password (device level and account level (e.g., app credentials)); cardholder device details; date of birth; social security number (SSN); citizenship; business license/driving license and/or government identification; university degree, and/or the like. One of ordinary skill will appreciate that a variety of user personal identifiers and/or credentials are within the scope of the present invention.

Still further, examples of transaction history data include one or more of historical records for transactions of the financial account; online history records; and data types reflected in financial institution records generated in connection with previous user authentication processes. In one or more embodiments, the transaction history data may include one or more refined datapoints and/or cardholder and/or authentication score(s) such as, for example, the Know Your Customer (KYC) score promulgated under applicable law as of the date of initial filing of the present disclosure and/or retrieved from the issuer and/or interchange network.

Yet still further, behavioral biometrics data is discussed in more detail above, and may include one or more of: device-based gestures; voice parameters; keystrokes; speech patterns; and device level parameters. The behavior biometrics data may be of the type(s) configured during registration and/or represented—whether in raw or refined form(s)—in the hidden profile built in connection with registration and, optionally, updated periodically thereafter.

For example, such data which may be compared against the hidden profile—in raw or refined form—may include one or more biometric scans or digital representations of a physical feature(s) of the cardholder user. The physical feature(s) may include, for example, a fingerprint image, a voice recording, a retinal image, facial recognition, palm print image, iris recognition, and the like. Other biometric or behavioral data may include, for example: height and/or movement patterns of the cardholder device; data entry patterns of the user at a user interface of the cardholder device; objects frequently found proximate the photographic element of the cardholder device; and other data reflecting behavior and/or physical states of the individual, physical states of the individual's surroundings and/or changes in those physical states. In additional examples, the data may include or be analyzed to determine: phone position in three-dimensional space indicating posture; phone movements indicating patterns of movement of the cardholder; timestamp data associated with one or more recorded system event(s) or sensor data acquisitions, which may be associated with normal behavioral patterns of the cardholder; proximity of at least one cardholder device to another object or entity; speed of activities of the cardholder recorded at a user interface, for instance speed and/or quality of input such as typing; vocal patterns; movement patterns and/or locations determined via geolocation element of a mobile device (e.g., smartphone); voice characteristics; key stroke patterns; changes in device level parameters such as media access control (MAC) identification; video and/or microphone sensor data captured by the cardholder device; behavioral patterns of the cardholder with respect to handling a mobile device at a particular time and/or in connection with a particular task, and/or other such information and/or a combination of any of the foregoing.

It should also be noted again that all or some of the stopgap authenticator data may be collected and/or transmitted by the cardholder device intermittently, continuously and/or as triggered by the transaction request or other event, all within the scope of the present invention.

Referring to step 505, it may be determined that comparison of the stopgap authenticator data against the hidden profile for the cardholder and account satisfies a threshold for authenticating the cardholder and device. The determination may be made at or via the interchange network and/or stopgap authenticator system in connection with the transaction request.

In one or more embodiments, analysis of the stopgap authenticator data may be multi-factorial, and may be evaluated according to a variety of decisioning algorithms comprising or incorporating, for example, decision trees, weight functions such as weighted summations, neural networks and/or other technologies for evaluating multiple factors to determine satisfaction of a threshold requirement.

For example, the device security data may be evaluated against database and/or hidden profile data and/or standards according to a set of strict requirements and/or a weight function such as a weighted summation that must meet a minimum threshold which, if not met, automatically leads to a refusal to generate a stopgap authenticator token. Assuming the device security data check and corresponding threshold are met, the remaining stopgap authenticator data and/or a subset thereof may be evaluated according to a weighted summation or other more flexible multi-factorial analysis to determine whether a stopgap authenticator token should be issued. However, the device security data check may be pooled with the evaluation of the other stopgap authenticator data, and/or the multi-factorial analysis may proceed according to alternative algorithm(s), without departing from the scope of the present invention.

One of ordinary skill will appreciate that, in one or more embodiments, the aim of the multi-factorial analysis, including comparison of the stopgap authenticator data against the hidden profile, is to determine whether available data about the cardholder and/or device—provided in connection with a transaction request—sufficiently matches known aspects of that cardholder and/or device and is sufficiently trustworthy in terms of sourcing and integrity, such that the system should recommend approval of the transaction despite deficient viability of the public key authenticator and signature relative to the risk presented by the transaction in question.

Further, as noted above, subsets of the stopgap authenticator data may be evaluated, e.g., as governed by data availability and/or pre-configured settings, within the scope of the present invention.

Referring to step 506, a stopgap authenticator token may be generated based on satisfaction of the basic integrity and stopgap authenticator data thresholds. The token may be generated at or via the interchange network and/or stopgap authenticator system in connection with the transaction request.

As discussed in more detail above, the token may be an SSI token comprising random and/or encoded alphanumeric character strings decipherable and/or matchable by one or more other computing devices in the multi-party transaction network system, such as an issuer. It is also foreseen that the token may not simply convey a binary "pass/fail" type message, but may also or alternatively be encoded according to, and may convey, a degree of confidence with respect to one or more aspects of the basic integrity and stopgap authenticator data thresholds. For example, the token may encode a degree of confidence with respect to how closely all or some of the stopgap authenticator data matched the hidden profile and/or how well the basic integrity requirement(s) were satisfied. These encoded classifications may be raw and/or made along a scale and/or according to a plurality of tiers, respectively, within the scope of the present invention. For example, a degree of confidence for each type of stopgap authenticator data and/or the basic integrity requirement(s) may be determined and respectively encoded with the token.

In one or more embodiments, if the basic integrity and/or stopgap authenticator data thresholds are not met, the transaction request itself and/or corresponding explicit or implicit request for stopgap authenticator token may be denied, and a token may accordingly not be issued.

Also or alternatively, if the basic integrity and/or stopgap authenticator data thresholds are not initially met, additional steps enabling possible updates may occur. For example, in one or more embodiments, the interchange network and/or stopgap authenticator system may attempt further verification and/or authentication to update the hidden profile in view of non-matching stopgap authenticator data. Certain datapoints represented in the hidden profile and/or data stored in the database of the interchange network—such as device parameters that regularly change as a result of periodic updates, personal history details and/or locations, and the like—are expected to change throughout the normal course of the cardholder's and/or device's life. Where one or more of these datapoints—as represented in the stopgap authenticator data received in connection with a transaction request—is not matched in the hidden profile, the interchange network and/or stopgap authenticator system may automatically update the hidden profile with the new data in the stopgap authenticator data.

The update may, in some cases, be made contingent on the cardholder and/or device first satisfying additional verification and/or authentication steps (i.e., secondary authentication steps) such as, for example, successful completion of one or more identity challenges and/or traditional authentication steps. Preferably, the secondary authentication step(s) include at least one type of secondary authentication which was not relied on for generation of the initial signed challenge. Such secondary authentication may include performance of a pre-determined authentication act in direct response to a challenge issued via a user interface of the device, such as input/entry of a pre-determined password or keycode or performance of a pre-determined sequence of gestures; possession of a pre-determined authentication device, such as where a personal electronic device or a querying device issues a challenge that can only reasonably be satisfied through possession of a pre-determined device (e.g., possession of a specific cellular telephone can be proven by entry of one-time code transmitted only to that device); and/or presentation to a sensor of a personal electronic device of a pre-determined aspect of the individual's physical features or manifestations for recordation (e.g., a challenge issued via the personal electronic device for the speaking of certain words, the presentation of a bodily feature such as an iris or a face, or the like).

Wherever the interchange network and/or stopgap authenticator system is configured to recognize a datapoint of a hidden profile that is eligible for automatic update based on unmatched stopgap authenticator data, and/or the corresponding update verification and/or authentication criteria are satisfied (e.g., by successful completion of one or more challenges to the cardholder/device, including those sampled above), the hidden profile may be automatically updated to reflect the stopgap authenticator data and, in one or more embodiments, the stopgap authenticator token for the instant transaction request may also be generated and issued.

Referring to step 507, the token and transaction data associated with the underlying transaction request may be transmitted. For example, in one or more embodiments, the token and transaction data are transmitted along with the transaction request to one or more other computing devices in the multi-party transaction network system, such as an issuer. The token may be transmitted by the interchange network and/or stopgap authenticator system in connection with the transaction request. Also or alternatively, the transmission may be to a merchant, the cardholder device, or otherwise within the scope of the present invention.

In one or more embodiments, other computing devices in the multi-party transaction network system, such as an issuer server, may receive the token, transaction data, the signature generated by the public key authenticator, and the transaction request, and may process one or more of these to either approve or deny the transaction. For example, the receiving issuer server may determine the transaction risk is not satisfied by the signature alone, may decode or otherwise recognize the validity of the received stopgap authenticator token and, based on the presence of the stopgap authenticator token, may approve the transaction according to the logic of one or more algorithms. In one or more embodiments, the issuer server is configured with a decisioning algorithm according to which the transaction request would have been rejected had the signature been present but the token had not. In one or more embodiments the token may be decoded to extract a degree of confidence for one or more type(s) of stopgap authenticator data and/or the basic integrity requirement(s) and the degree(s) of confidence may be used (e.g., using a weighted function or other algorithm or analysis) to evaluate whether approval or denial of a transaction is warranted.

Accordingly, one or more embodiments of the present invention extend the viability of public key authenticators which otherwise would be inadequate—whether by reason of outdated or insufficient hardware, software or the like—to authenticate one or more high-risk transactions.

Any actions, functions, operations, and the like recited herein may be performed in the order shown in the figures and/or described above or may be performed in a different order. Furthermore, some operations may be performed concurrently as opposed to sequentially. Although the computer-implemented method is described above, for the purpose of illustration, as being executed by an example system and/or example physical elements, it will be understood that the performance of any one or more of such actions may be differently distributed without departing from the spirit of the present disclosure.

Additional Considerations

All terms used herein are to be broadly interpreted unless otherwise stated. For example, the term "payment card" and the like may, unless otherwise stated, broadly refer to substantially any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transaction card can be used as a method of payment for performing a transaction.

As used herein, the term "cardholder" may refer to the owner or rightful possessor of a payment card. As used herein, the term "cardholder account" may refer specifically to a PAN or more generally to an account a cardholder has with the payment card issuer and that the PAN is or was associated with. As used herein, the term "merchant" may refer to a business, a charity, or any other entity that can generate transactions with a cardholder account through a payment card network.

In this description, references to "one or more embodiments," "an embodiment," or "embodiments" mean that the feature or features being referred to are included in at least one or more embodiments of the technology. Separate references to "one or more embodiments," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one or more embodiments may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor includes a general-purpose processor configured using software, the general-purpose processor may be configured as respective different processors at separate times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at separate times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a specific location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

1. A payment authentication system comprising:

a processor; and a memory device storing computer-executable instructions thereon that, when executed by the processor, cause the processor to:

receive a signed challenge from a public key authenticator of a mobile device registered to a financial account of a user;

receive a real-time transaction request and transaction data associated with the signed challenge;

determine that the public key authenticator satisfies a basic integrity requirement;

receive stopgap authenticator data including device security data and one or more of the following: a user personal identifier, a user personal credential, transaction history data of the user, and behavioral biometrics data generated at the user mobile device;

determine that at least one data type of the stopgap authenticator data includes data that does not match corresponding data of a hidden profile for the financial account;

based on the nonmatch determination, perform a secondary authentication step comprising one or both of (i) issuing an identity challenge to the user via the mobile device, or (ii) transmitting a requirement for performance of a step up transaction via the mobile device;

determine that the user successfully completed the secondary authentication step;

based on the determination of successful completion, update the corresponding data of the hidden profile based on the nonmatching data of the additional stopgap authenticator data;

compare the stopgap authenticator data to the hidden profile for the financial account to determine that a matching threshold is satisfied;

based on the satisfaction of the matching threshold and of the basic integrity requirement, generate a stopgap authenticator token; and transmit the stopgap authenticator token and the transaction data for real-time transaction approval.

2. The payment authentication system of claim 1, wherein the computer-executable instructions, when executed by the processor, further cause the processor to approve the transaction request in real-time based on the stopgap authenticator token.

3. The payment authentication system of claim 1, wherein the computer-executable instructions, when executed by the processor, further cause the processor to determine that a security level of the public key authenticator does not satisfy a security requirement for the transaction request, and wherein one or both of the receipt of the stopgap authenticator data and the generation of the stopgap authenticator token is based on the determination that the security requirement is not satisfied.

4. The payment authentication system of claim 1, wherein the stopgap authenticator data comprises a plurality of data types and the determination that the matching threshold is satisfied includes implementing a weight function to evaluate the plurality of data types.

5. The payment authentication system of claim 1, wherein the basic integrity requirement specifies one or more of the following data types for the public key authenticator of the mobile device: certification by a predetermined entity; secure private key storage; secure private key cryptographic management practices; user presence verification; protection against replay attacks; and device attestation.

6. The payment authentication system of claim 1, wherein the device security data include one or more of the following data types for the mobile device: secure firmware boot verification; firmware anti-tampering and code integrity check; physical security feature check; secure communication verification; and firmware version, update and patch check.

7. The payment authentication system of claim 1, wherein the transaction history data include one or more of the following: historical records for transactions of the financial account; online history records; and data types reflected in financial institution records generated in connection with previous user authentication processes.

8. The payment authentication system of claim 1, wherein the stopgap authenticator data include the behavioral biometrics data comprising one or more of the following data types for the mobile device: device-based gestures; voice parameters; keystrokes; speech patterns; and device level parameters.

9. The payment authentication system of claim 1, wherein the computer-executable instructions, when executed by the processor, further cause the processor to select a degree of confidence from among a plurality of degrees of confidence based on the satisfied matching threshold, and wherein the stopgap authenticator token is encoded, and the stopgap authenticator token is configured for interpretation by a transaction-approving device to convey, the selected degree of confidence.

10. A computer-implemented method for payment authentication comprising, via one or more transceivers and/or one or more processors:

- receiving a signed challenge from a public key authenticator of a mobile device registered to a financial account of a user;
- receiving a real-time transaction request and transaction data associated with the signed challenge;
- determining that the public key authenticator satisfies a basic integrity requirement;
- receiving stopgap authenticator data including device security data and one or more of the following: a user personal identifier, a user personal credential, transaction history data of the user, and behavioral biometrics data generated at the user mobile device;
- determining that at least one data type of the stopgap authenticator data includes data that does not match corresponding data of a hidden profile for the financial account;
- based on the nonmatch determination, performing a secondary authentication step comprising one or both of (i) issuing an identity challenge to the user via the mobile device, or (ii) transmitting a requirement for performance of a step up transaction via the mobile device;
- determining that the user successfully completed the secondary authentication step;
- based on the determination of successful completion, updating the corresponding data of the hidden profile based on the nonmatching data of the additional stopgap authenticator data;
- comparing the stopgap authenticator data to the hidden profile for the financial account to determine that a matching threshold is satisfied;
- based on the satisfaction of the matching threshold and of the basic integrity requirement, generating a stopgap authenticator token; and
- transmitting the stopgap authenticator token and the transaction data for real-time transaction approval.

11. The method of claim 10, further comprising, via the one or more processors and/or one or more transceivers, approving the transaction request in real-time based on the stopgap authenticator token.

12. The method of claim 10, further comprising, via the one or more processors and/or one or more transceivers, determining that a security level of the public key authenticator does not satisfy a security requirement for the transaction request, wherein one or both of the receipt of the stopgap authenticator data and the generation of the stopgap authenticator token is based on the determination that the security requirement is not satisfied.

13. The method of claim 10, wherein the stopgap authenticator data comprises a plurality of data types and the determination that the matching threshold is satisfied includes implementing a weight function to evaluate the plurality of data types.

14. The method of claim 10, wherein the basic integrity requirement specifies one or more of the following data types for the public key authenticator of the mobile device: certification by a predetermined entity; secure private key storage; secure private key cryptographic management practices; user presence verification; protection against replay attacks; and device attestation.

15. The method of claim 10, wherein the device security data include one or more of the following data types for the mobile device: secure firmware boot verification; firmware anti-tampering and code integrity check; physical security feature check; secure communication verification; and firmware version, update and patch check.

16. The method of claim 10, wherein the transaction history data include one or more of the following: historical records for transactions of the financial account; online history records; and data types reflected in financial institution records generated in connection with previous user authentication processes.

17. The method of claim 10, wherein the stopgap authenticator data include the behavioral biometrics data comprising one or more of the following data types for the mobile device: device-based gestures; voice parameters; keystrokes; speech patterns; and device level parameters.

18. The method of claim 10, further comprising, via the one or more processors and/or one or more transceivers, selecting a degree of confidence from among a plurality of degrees of confidence based on the satisfied matching threshold, and wherein the stopgap authenticator token is encoded, and the stopgap authenticator token is configured for interpretation by a transaction-approving device to convey, the selected degree of confidence.

* * * * *